(No Model.)

R. M. HUNTER.
REGULATING VALVE.

No. 571,833. Patented Nov. 24, 1896.

Witnesses.
Henry Drury
R. M. Kelly

Inventor.

United States Patent Office.

RUDOLPH M. HUNTER, OF PHILADELPHIA, PENNSYLVANIA.

REGULATING-VALVE.

SPECIFICATION forming part of Letters Patent No. 571,833, dated November 24, 1896.

Application filed July 17, 1896. Serial No. 599,498. (No model.)

*To all whom it may concern:*

Be it known that I, RUDOLPH M. HUNTER, of the city and county of Philadelphia and State of Pennsylvania, have invented an Improvement in Regulating-Valves for Beer-Delivering Apparatus, &c., of which the following is a specification.

My invention has reference to regulating-valves for beer-delivering apparatus, &c.; and it consists of certain improvements which are fully set forth in the following specification and are shown in the accompanying drawings, which form a part thereof.

This application comprehends certain improvements adapted to apparatus for delivering beer from the keg, and especially relates to the construction of the regulating or control valve for governing the production of compressed air by the air-pump.

In carrying out my invention I combine a valve for controlling the supply of water or motor fluid with an air-controlled diaphragm for operating the valve and an adjustable spring operating to oppose the action of the diaphragm for the purpose of opening the valve. The valve-seat I make of rubber, preferably in the form of an undercut or flanged perforated disk, which is snapped into place within the valve-body and upon the annular diaphragm thereof. The valve moves to or from the said soft-rubber valve-seat, and is preferably made cup-shaped, so as to close tightly upon the seat without the expenditure of much force. The diaphragm of the air-chamber is provided with a screw-threaded hub, and upon this is arranged an adjustable nut receiving one end of a coiled spring, the other end of which is supported by the main frame. By adjusting the nut the valve may be made to respond to any desired degree of pressure exerted upon the diaphragm by the air, and thus the action of the air-compressing pump governed.

My improvements will be better understood by reference to the accompanying drawings, in which—

Figure 1:
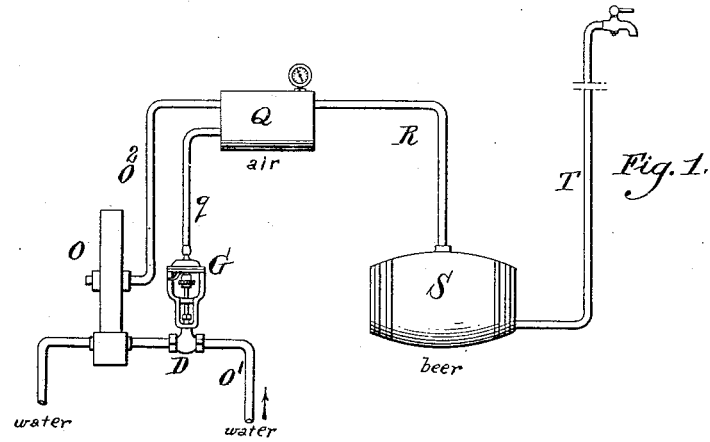
Figure 3:
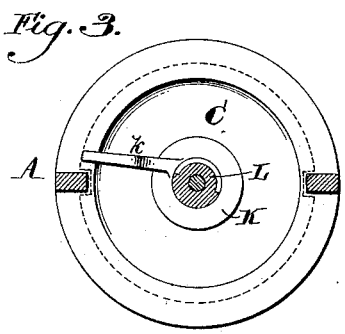
Figure 2:
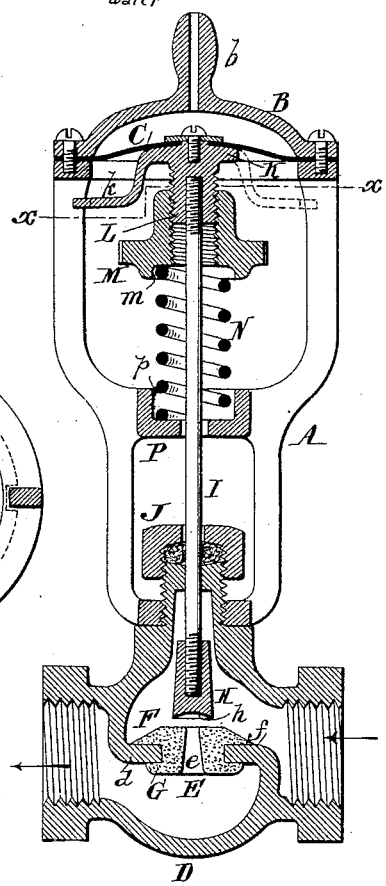

Figure 1 is an elevation of a beer-delivering apparatus, showing the position of my improved valve when in use. Fig. 2 is a sectional elevation of a controlling-valve embodying my improvements, and Fig. 3 is a sectional plan view of same on line $x\, x$.

A is the main frame and carries at the top an air-chamber B, having a nipple $b$ and closed on the bottom by a rubber or flexible diaphragm C. Screwed to the bottom of this frame A is a fluid-valve D, having an annular diaphragm $d$ interposed between the inlet and outlet chambers. Fitted to this diaphragm is a rubber seat E, formed with a central aperture $e$ and flanges F G to fit tightly upon the edge of the diaphragm. The flange F is tapered to a knife-edge at $f$, so as to make a liquid-tight joint under the pressure of the water. The natural elasticity of the rubber will make the seat fit tightly to the valve-diaphragm, and hence, if desired, the thin edge $f$ may be omitted. The rubber seat may be formed in any other suitable manner, so as to snap or be self-attachable to the valve-body.

The valve H is made cup-shaped, as at $h$, to form an annular edge adapted to make a tight fit upon the rubber seat without much pressure having to be exerted. This valve is secured to the end of the valve-rod I, which extends up through the stuffing-box J and screwed into the bottom of a flanged casting K, secured to the under side of the rubber diaphragm. This flanged casting K is provided with a hub L, upon which the adjustable nut M is screwed. The nut M is somewhat cup-shaped on the bottom, as at $m$, into which fits the upper end of a coiled spring N. The lower end of this spring rests in an annular groove $p$ in a cross-bar P of the main frame A. To prevent strain being put upon the rubber diaphragm C when adjusting the nut M, I provide an arm or annular rim K, which extends laterally and may be held by the hand or main frame when turning the adjusting-nut. If desired, the arm may be in the form of an annular flange corresponding in diameter to that of the nut M.

Referring to Fig. 1, O is the air-pump and is usually operated by water fed to it by a pipe O', in which my improved valve is located. The air-pipe O² leads from the pump to the air-reservoir Q. A pipe $g$ leads from the air-reservoir to the nipple $b$ of the air-chamber B of my improved valve. An air-pipe R also leads from the reservoir to the beer-keg S, and a beer-pipe T leads from the keg to the bar. The pump O supplies compressed air to the reservoir, which furnishes the air to the keg for the purpose of lifting the beer. The air is maintained at a uniform pressure by controlling the operation of the air-pump, and this is done by the fluid-valve D under the influence of the air-actuated diaphragm.

While I prefer the details of construction of regulating-valve shown, I do not confine myself to the minor features thereof, as they may be modified without departing from the spirit of my invention.

What I claim as new, and desire to secure by Letters Patent, is—

1. In a valve device the combination of the body of a valve having an annular diaphragm, with a rubber seat having annular flanges to snap upon the inner edge of the annular diaphragm, and a movable valve adapted to seat itself upon the rubber seat.

2. In a valve device the combination of the body of a valve having an annular diaphragm, with a rubber seat having annular flanges to snap upon the inner edge of the annular diaphragm, and a movable valve adapted to seat itself upon the rubber seat, provided with a cup-shaped bottom to form a sharp annular edge.

3. In a valve device the combination of the body of a valve having an annular diaphragm, with a rubber seat having annular flanges to snap upon the inner edge of the annular diaphragm, and a movable valve adapted to seat itself upon the rubber seat provided with a cup-shaped bottom to form a sharp annular edge, a frame secured to the valve-body, an air-chamber attached to the frame, a movable diaphragm for the air-chamber, and a valve-stem extending from the valve to the movable diaphragm.

4. In a valve device the combination of the body of a valve having an annular diaphragm, with a rubber seat having annular flanges to snap upon the inner edge of the annular diaphragm, and a movable valve adapted to seat itself upon the rubber seat provided with a cup-shaped bottom to form a sharp annular edge, a frame secured to the valve-body, an air-chamber attached to the frame, a movable diaphragm for the air-chamber, and a valve-stem extending from the valve to the movable diaphragm, an adjustable nut carried by the movable diaphragm, and a spring between the nut and frame.

5. In a valve device the combination of the body of a valve having an annular diaphragm, with a rubber seat having annular flanges to snap upon the inner edge of the annular diaphragm, and a movable valve adapted to seat itself upon the rubber seat provided with a cup-shaped bottom to form a sharp annular edge, a frame secured to the valve-body, an air-chamber attached to the frame, a movable diaphragm for the air-chamber, and a valve-stem extending from the valve to the movable diaphragm and an adjustable spring to move the valve away from its seat.

6. In a valve device, the combination of a main frame, an air-chamber and regulating-diaphragm secured to one end of the frame, a valve-body secured to the other end of the frame, a movable valve, a valve-rod extending to the regulating-diaphragm, a metallic casting secured to the diaphragm and having a lateral extension for holding it against rotation, an adjustable spring support or nut secured to and movable with the said casting of the diaphragm, and a spring interposed between said support and the main frame to oppose the action of the regulating-diaphragm.

7. In a valve device, the combination of a main frame, an air-chamber and regulating-diaphragm secured to one end of the frame, a valve-body secured to the other end of the frame provided with a rubber seat, a movable valve, a valve-rod extending to the regulating-diaphragm, a metallic casting secured to the diaphragm and having a lateral extension for holding it against rotation, an adjustable spring support or nut secured to and movable with the said casting of the diaphragm, and a spring interposed between said support and the main frame to oppose the action of the regulating-diaphragm.

8. In a valve device, the combination of the body having an annular diaphragm, with a rubber seat held in place upon said diaphragm by its own elasticity or resiliency, and a movable valve having a cup-shaped bottom and annular edge to close upon said rubber seat.

In testimony of which invention I have hereunto set my hand.

R. M. HUNTER.

Witnesses:
R. M. KELLY,
J. J. BOYLE.